(12) United States Patent
Qian et al.

(10) Patent No.: US 8,311,010 B1
(45) Date of Patent: Nov. 13, 2012

(54) DATA INTEGRITY NEGOTIATION SCHEMES IN WIRELESS COMMUNICATION SYSTEMS

(75) Inventors: Nanjian Qian, San Diego, CA (US); Hua Mary Chion, Belle Mead, NJ (US); Cancan Huang, Poway, CA (US)

(73) Assignee: ZTE (USA) Inc., Morristown, NJ (US)

( * ) Notice: Subject to any disclaimer, the term of this patent is extended or adjusted under 35 U.S.C. 154(b) by 893 days.

(21) Appl. No.: 11/870,418

(22) Filed: Oct. 10, 2007

Related U.S. Application Data

(60) Provisional application No. 60/828,951, filed on Oct. 10, 2006.

(51) Int. Cl.
*H04W 4/00* (2009.01)
*H04W 36/00* (2009.01)

(52) U.S. Cl. ........................................ 370/331; 455/436

(58) Field of Classification Search .................. 370/331; 455/436
See application file for complete search history.

(56) References Cited

U.S. PATENT DOCUMENTS

| | | | |
|---|---|---|---|
| 2002/0054578 A1* | 5/2002 | Zhang et al. ................... | 370/328 |
| 2005/0036497 A1* | 2/2005 | Kawakami ................ | 370/395.21 |
| 2006/0028980 A1* | 2/2006 | Wright ........................... | 370/229 |
| 2006/0215607 A1* | 9/2006 | Mitchel et al. ................. | 370/331 |
| 2007/0021120 A1* | 1/2007 | Flore et al. ..................... | 455/436 |
| 2007/0298788 A1* | 12/2007 | Corson et al. .................. | 455/433 |
| 2008/0256220 A1* | 10/2008 | Bachmann et al. ........... | 709/222 |

OTHER PUBLICATIONS

3GPP TS 23.002 v7.1.0, "3rd Generation Partnership Project, Technical Specification Group Services and Systems Aspects, Network Architecture (Release 7)," Mar. 2006, 62 pages.
3 GPP2 S.R0037-0 v3.0, "IP Network Architecture Model for cdma2000 Spread Spectrum Systems," Aug. 21, 2003, 52 pages.

* cited by examiner

*Primary Examiner* — Ricky Ngo
*Assistant Examiner* — Paul H Masur
(74) *Attorney, Agent, or Firm* — Perkins Coie LLP

(57) ABSTRACT

Techniques and system designs are described for providing mobile communication systems with negotiation mechanisms to select data integrity schemes based on quality of service (QoS) schemes to enhance system performance during mobile handover processes. In one aspect, a method for providing data integrity in a wireless communication network includes providing a quality of service (QoS) profile for a service flow for a mobile station to include information of one or more QoS requirements of the service flow and a data integrity indicator to indicate information of data integrity for the service flow during a handover of the mobile station from one base station to another base station; and using the data integrity indicator to assist selection of a data integrity scheme from one or more data integrity schemes available to the service flow during the handover of the mobile station.

14 Claims, 7 Drawing Sheets

DATA INTEGRITY NEGOTIATION SCHEMES IN WIRELESS COMMUNICATION SYSTEMS

This application claims priority of U.S. Provisional Application No. 60/828,951 entitled "Data Integrity Negotiation Schemes in Wireless Communication Systems" and filed on Oct. 10, 2006, which is incorporated by reference as part of the specification of this application.

BACKGROUND

Wireless communication systems use electromagnetic waves to communicate with wireless communication devices located within cells of coverage areas of the systems. A radio spectral range or band designated or allocated for a wireless communication service or a particular class of wireless services may be divided into different radio carrier frequencies for generating different communication frequency channels. This use of different frequencies for different communication channels may be used in various multiple access radio wireless communication systems.

Wireless communication systems provide a hand-over or hand-off (HO) process where a mobile station (MS) changes from communications with one base station (BS) to communications with another adjacent base station due to motion of the mobile station or other reasons. For example, the hand over may be initiated when the MS moves in its location due to signal fading, interference levels, etc. at the current serving base station and thus needs to change another base station to which the MS is connected in order to provide a higher signal quality. In another example, a hand over may be initiated when the MS can be serviced with higher quality of service (QoS) at another base station. Such a hand over process can be used to ensure continuing communication services to the MS and may be implemented in different ways. For example, a hand over process can be configured to operate the MS to simultaneously communicate with and to receive and send communication traffic with two or more adjacently located base stations and to synchronize the data among the different communication traffic flows with the different base stations during the hand over process.

In various wireless communication systems such as a Mobile Network system, Data Integrity Schemes have been defined and used to prevent packet data loss during normal packet transmission, handover or other situations within the system.

SUMMARY

This application describes examples of techniques and system designs for providing mobile communication systems with negotiation mechanisms to select data integrity schemes based on quality of service (QoS) schemes to enhance system performance during mobile handover processes. In one aspect, a method for providing data integrity in a wireless communication network includes providing a quality of service (QoS) profile for a service flow for a mobile station to include information of one or more QoS requirements of the service flow and a data integrity indicator to indicate information of data integrity for the service flow during a handover of the mobile station from one base station to another base station; and using the data integrity indicator to assist selection of a data integrity scheme from one or more data integrity schemes available to the service flow during the handover of the mobile station.

In another aspect, a wireless communication network includes a plurality of base stations to form a wireless access network to provide wireless radio communications with mobile stations; a network mechanism to provide a quality of service (QoS) profile for a service flow for a mobile station to include information of one or more QoS requirements of the service flow and a data integrity indicator to indicate information of data integrity for the service flow during a handover of the mobile station from one base station to another base station; and a network mechanism to use the data integrity indicator to assist selection of a data integrity scheme from one or more data integrity schemes available to the service flow during the handover of the mobile station.

In yet another aspect, a wireless communication network includes a network of a plurality of data path functions; an anchor data path function; a mechanism to support a plurality of data integrity schemes; and a mechanism to exchange messages amongst the data path functions and the anchor data path function during a hand over process for a mobile station to allow in the anchor data path function to select a selected data integrity scheme from the plurality of data integrity schemes to use in communications with the mobile station between the data path functions such that each data path function supports the selected data integrity scheme and is inline with a data integrity scheme of a policy enforcement function.

These and other aspects, examples and implementations of various techniques and system designs are described in detail in the attached drawings, the description and the claims.

DETAILED DESCRIPTION

Figure 1:
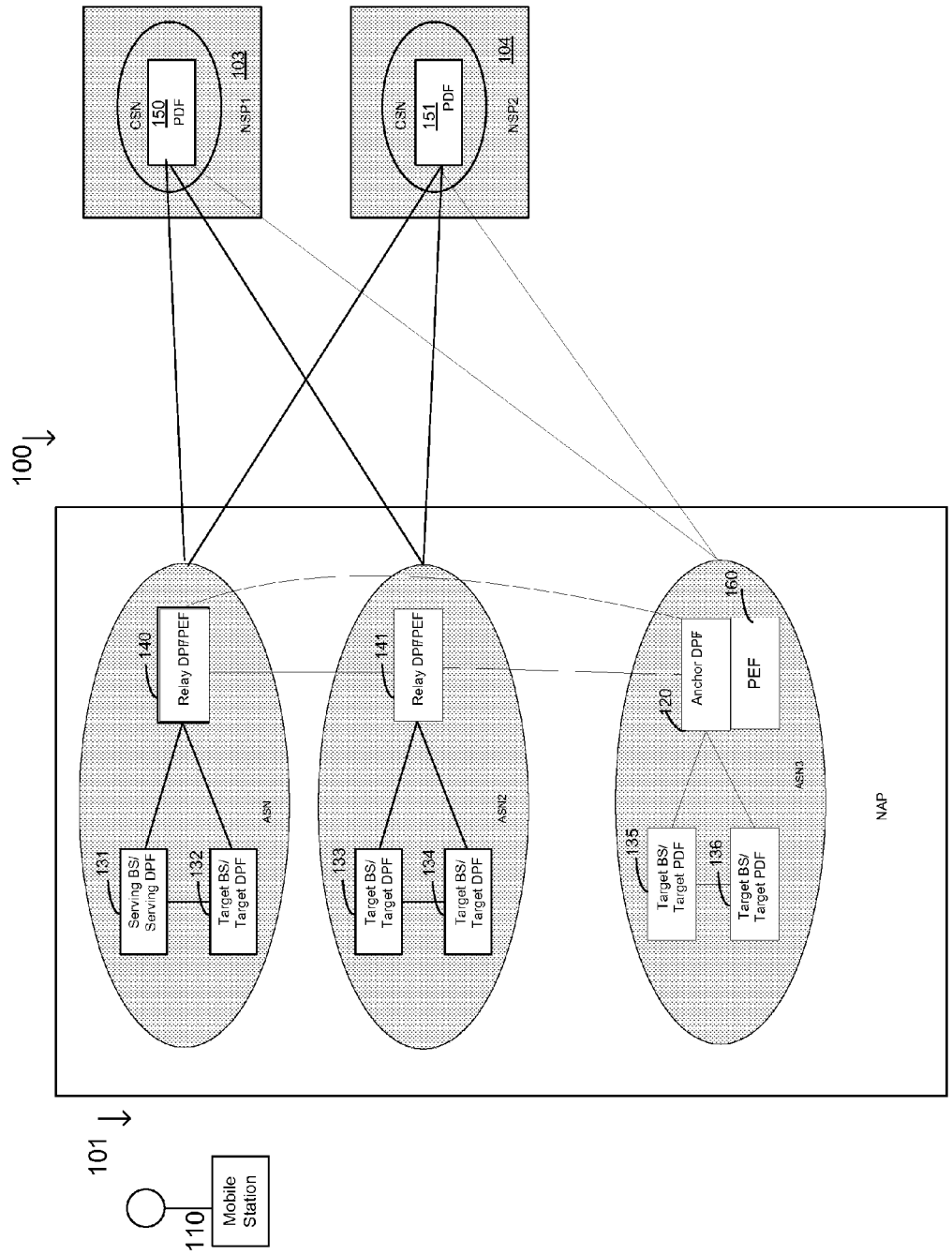
FIG. 1 is a wireless network architecture.

Various mobile communication system designs do not provide technical linkage between Data Integrity Schemes and QoS Schemes and implement the Data Integrity Schemes and QoS Schemes. It can be beneficial to operate the Data Integrity Schemes and QoS Schemes in a communication system with certain relationships to guarantee Service Flow QoS, improve overall system performance and enhance system flexibility. For example, Data Integrity Schemes may be designed to interact with QoS related Functions such as QoS Policy Decision Function, and Policy Enforcement Function, the Handoff Function and the Data Path Function.

Various technical issues arise in the data integrity negotiation and selection subject. For example, how does a network determine whether data integrity should be activated for an application or service flow? How is a Data Integrity Scheme selected for each service flow? Which network entity should be used to perform the selection of data integrity scheme? How is the data integrity capability negotiated among related network entities?

The examples of various techniques and system designs described in this application can be implemented to address one or more of the above and other data integrity issues and can be used for various wireless mobile network systems, including but not limited to 3rd Generation Partnership Project (3GPP), 3GPP2, and WiMAX systems. Various functions used in the examples described in this application are common to various standards for mobile networks, e.g., 3GPP TS 23.002 V7.1.0 (2006-03) in 3GPP standard, and S.R0037-0_v3.0__111303 in 3GPP2 standard.

Various wireless communication systems use QoS service profiles as part of the QoS schemes. A QoS service profile is a collection of QoS parameters that define the QoS requirements of an application or service flow and can be, for example, defined by the network operators. In a Mobile Network, QoS service profile can be passed from Policy Decision Function (PDF) which may be in the core network to Policy Enforcement Function which may be in the access network side when a service flow is being set up.

Multiple schemes can be used to provide data integrity during HO. For example, data packets can be simultaneously sent to the current serving base station and target base station in a multi-unicasting data integrity scheme. For another example, under a buffering data integrity scheme, the data packets can be buffered at the anchor data path function located in a gateway and the buffered data can subsequently be forwarded to the target base station when the target base station becomes the new serving base station. An automatic retransmission request (ARQ) scheme may also be used as a data integrity scheme. ARQ has been used to provide reliable data transmission over a radio link or other communication links. When HO happens, ARQ parameters can be synchronized between the old radio link and the new radio link in order to maintain the data integrity. Such ARQ synchronization scheme is one of the Data Integrity schemes.

Each data integrity scheme can require a different set of network capabilities while providing different performance parameters such as communication delay and latency. A Data Integrity Scheme can be determined as more suitable to a set of service classes based on its performance measurement and the QoS parameters of the service classes as well as local policy.

FIG. 1 depicts an example of a wireless communication network architecture 100 for providing wireless communication services to mobile stations 110 and other subscriber stations. This network 100 includes a wireless network 101 made of serving base station 131, target base stations 132-136, a network access provider (NAP) 102, and network service providers (NSPs) 103 and 104. The base stations represent the physical entities in the wireless access network. A serving base station can include a serving data path function that represents a functional entity within the base station. A target base station can include a target data path function that represents a functional entity within the base station. A mobile station 110 may move between various base stations 131-136 within the wireless network 101. When a mobile station 110 does move from one base station to another, a handover process is started and controlled by a handover function. A handover function controls the overall handover decision, operating, and signaling procedures of the handover. The handover function may reside in the base station, gateway element, or a combination of the two.

Multiple data path functions can be provided in the network 100. Data path functions (DPFs) manage the data path setup and transmission of data packets between two peer data path function entities. When a mobile station 110 connects to the wireless network 101, the mobile station 110 is assigned an anchor DPF 120 in the NAP 102. The anchor DPF 120 tracks the location of the mobile station 110 across handovers and forwards received data packets to the mobile station 110. The serving DPF 131 has a direct association with the base station 111 which in turn has a direct association with the mobile station 110 via wireless network 101. The serving DPF 131 is responsible for the delivery of packet data to the mobile station 110.

When the mobile station 110 handover to different BS, it must switch its serving DPF to a potential new serving DPF called a target DPF. In the illustrated example in FIG. 1, the target DPF 133 communicates with the anchor DPF 120 to prepare a new data path to replace the current data path after the completion of the handover. Upon a successful handover, the target DPF 133 will assume the role of a serving DPF. The relay DPF 140 and 141 mediate packet data delivery between serving, target, and anchor DPFs.

Each NSP (103 or 104) includes a policy decision function (PDF) (150 or 151) that makes decisions related to the Quality of Service (QoS) and other policy decisions based on policy setup information. The NAP 102 includes policy enforcement functions (PEFs) 160 which carry out the policy decisions of the PDF 150 and PDF 151 within the network. The PEF 160 can be collocated in the anchor DPF 120 as illustrated in FIG. 1 or be a separate entity from the anchor DPF 120. A service flow refers to QoS specifications over a data path for a particular flow of data packets.

When packet data is transmitted over the wireless network 101, data packets may be lost or corrupted. When MS does a handover from serving BS to target BS, the data packets can be lost in the middle of handover procedure if no data integrity scheme is enabled. A data integrity scheme increases the likelihood that packet data will arrive at its intended destination intact or with minimized loss of data integrity. Examples of data integrity schemes include multi-unicasting, buffering, and automatic retransmission request (ARQ) synchronizing. However, different applications may require different data integrity schemes and different network service providers may have different data integrity scheme requirements. This presence of different data integrity schemes and different data integrity scheme requirements by different NSPs can complicate the interactions between the data integrity schemes and QoS schemes. In addition, the participating DPFs of the network 102 may vary in their support of different data integrity schemes. For these and other reasons, it is desirable to provide a mechanism that negotiates a data integrity scheme between the participating elements of the network 102. Specific examples of data integrity negotiation schemes are described below.

TABLE 1

Mapping Table for Data Integrity

| QoS Class of Service Flow | Data Integrity Scheme |
|---|---|
| Class 1 | Scheme 1 |
| Class 2 | Scheme 2 |
| Class 3 | Scheme 3 and 4 |
| Class 4 | No Scheme |

Before data integrity scheme negotiation, the PDF 150 transmits policy decisions to the PEF 160. These policy decisions include the Quality of Service (QoS) service profile on a per service flow basis. The QoS service profile can include a data integrity scheme indicator. In one implementation, this indicator can include data to represent the type of data integrity scheme that the PEF 160 could use. In another implementation, this indicator can be a simple indicator that indicates a truth state or false state for the data integrity policy. For example, a single bit data may be used as this indicator to give a "0" for the false state and "1" for the truth state. A true indicator means that the local PEF 160 should use a remote policy that is established by the PDF 150. The PDF 150 establishes the remote policy with the PEF 160 before data integrity scheme negotiation. For example, the remote policy can be embodied by a mapping between QoS service profiles and data integrity schemes as shown by the example in Table 1.

Such a mapping is internal to the NAP 102 network. The example in Table 1 shows multiple relationships between QoS service profiles and data integrity schemes. For example, a QoS service profile can have more than one allowable data integrity scheme. A false indicator means that the local PEF 160 and the anchor DPF 120 can use a local policy on how to select a data integrity scheme. The local policy can be determined by an operator. Furthermore, the local policy can use a locally generated mapping such as the one shown in Table 1.

Figure 2A:
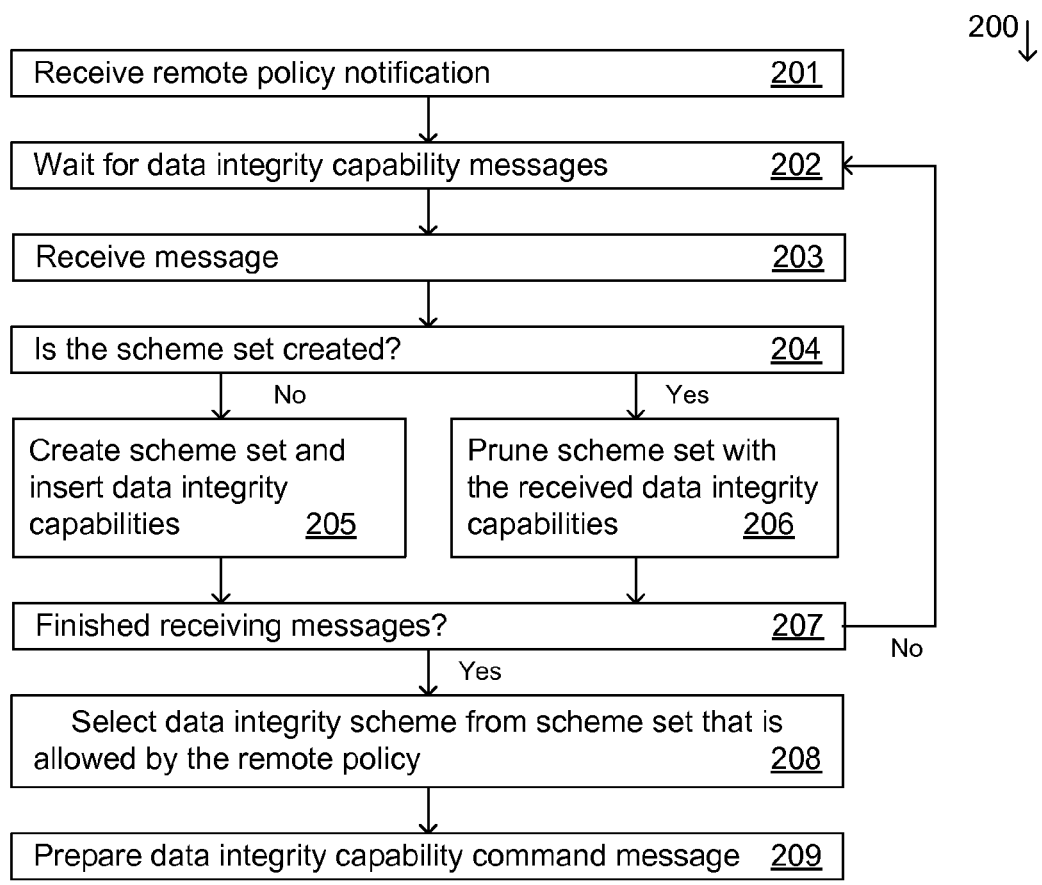
FIG. 2a is a block diagram of the data integrity scheme selection process using a remote policy.

FIG. 2a illustrates one example of a data integrity scheme selection process 200 using a remote policy. The anchor DPF 120 receives a data integrity scheme policy notification 201 from the PEF 160 for a service flow. The anchor DPF 120 will wait for incoming data integrity capability message 202 from the target DPF 133 and the serving DPF 130 or indirectly through one of the relay DPFs 140 and 141. In a data integrity capability, a DPF will specify its supported data integrity schemes. Once the DPF receives such a message 203, the anchor DPF 120 will determine 204 if it needs to create a scheme set. The scheme set can include types of data integrity schemes. When there is no scheme set for the service flow, a scheme set is created and the data integrity capabilities from the message of step 203 will be inserted into the scheme set 205. When the scheme set exists, elements of the scheme set will be removed if they are not present in the incoming data integrity capability information message (step 206). If the anchor DPF 120 is finished receiving messages 207, the anchor DPF 120 will select a scheme from the scheme set that is allowed by the received data integrity scheme policy received in step 201 (step 208). The anchor DPF 120 will generate 209 a data integrity command (DIC_CMD) message indicating the selected data integrity scheme.

Figure 2B:
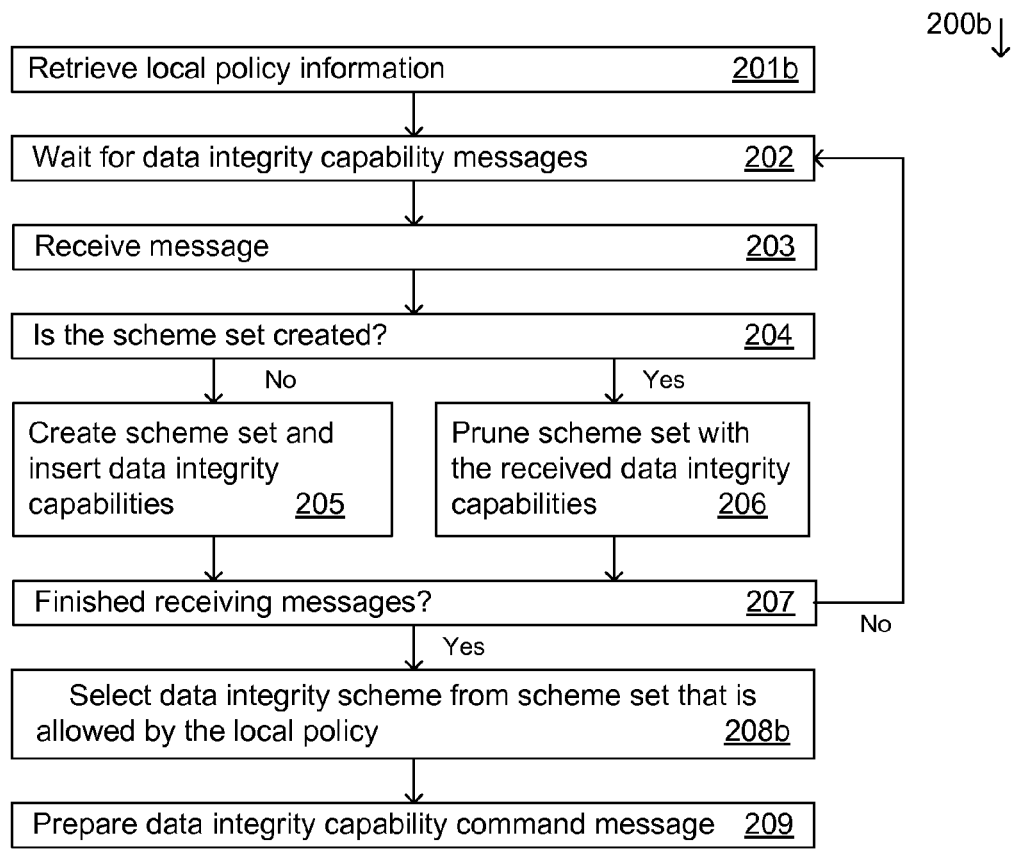
FIG. 2b is a block diagram of the data integrity scheme selection process using a local policy.

FIG. 2b illustrates one example of a data integrity scheme selection process 200b using a local policy. The anchor DPF 120 retrieves a local policy to use on the service flow. The anchor DPF 120 will wait for incoming data integrity capability message 202 from the target DPF 133 and the serving DPF 130 or indirectly through one of the relay DPFs 140 and 141. In a data integrity capability, a DPF will specify its supported data integrity schemes. Once the DPF receives such a message 203, the anchor DPF 120 will determine 204 if it needs to create a scheme set. When there is no scheme set for the service flow, a scheme set is created and the data integrity capabilities from the message of step 203 will be inserted into the scheme set 205. When the scheme set exists, elements of the scheme set will be removed if they are not present in the incoming data integrity capability information message (step 206). If the anchor DPF 120 is finished receiving messages 207, the anchor DPF 120 will select a scheme from the scheme set that is allowed by the local policy in step 201 (step 208b). The anchor DPF 120 will generate 209 a data integrity command (DIC_CMD) message indicating the selected data integrity scheme.

TABLE 2

An example of Data Integrity Capability TLV

| | |
|---|---|
| Type | Data Integrity Capability TLV |
| Length in Octets Value | 7 |
| Description | Data Integrity Compound TLV |
| Sub TLV | 1. Entity Identifier TLV 6 oct<br>2. Data Integrity Scheme TLV 4 oct |
| Sub TLV Values | 1. Entity Identifier TLV: DP Entity ID<br>2. Data Integrity Scheme TLV:<br>Bit 0: Multi-unicasting, Bit 1: Buffering,<br>Bit 3:ARQ Syncronizing, Bit 4-32: reserved.<br>If the bit set to 1, it means the corresponding capability is on. Otherwise, it's off. |

Figure 3:
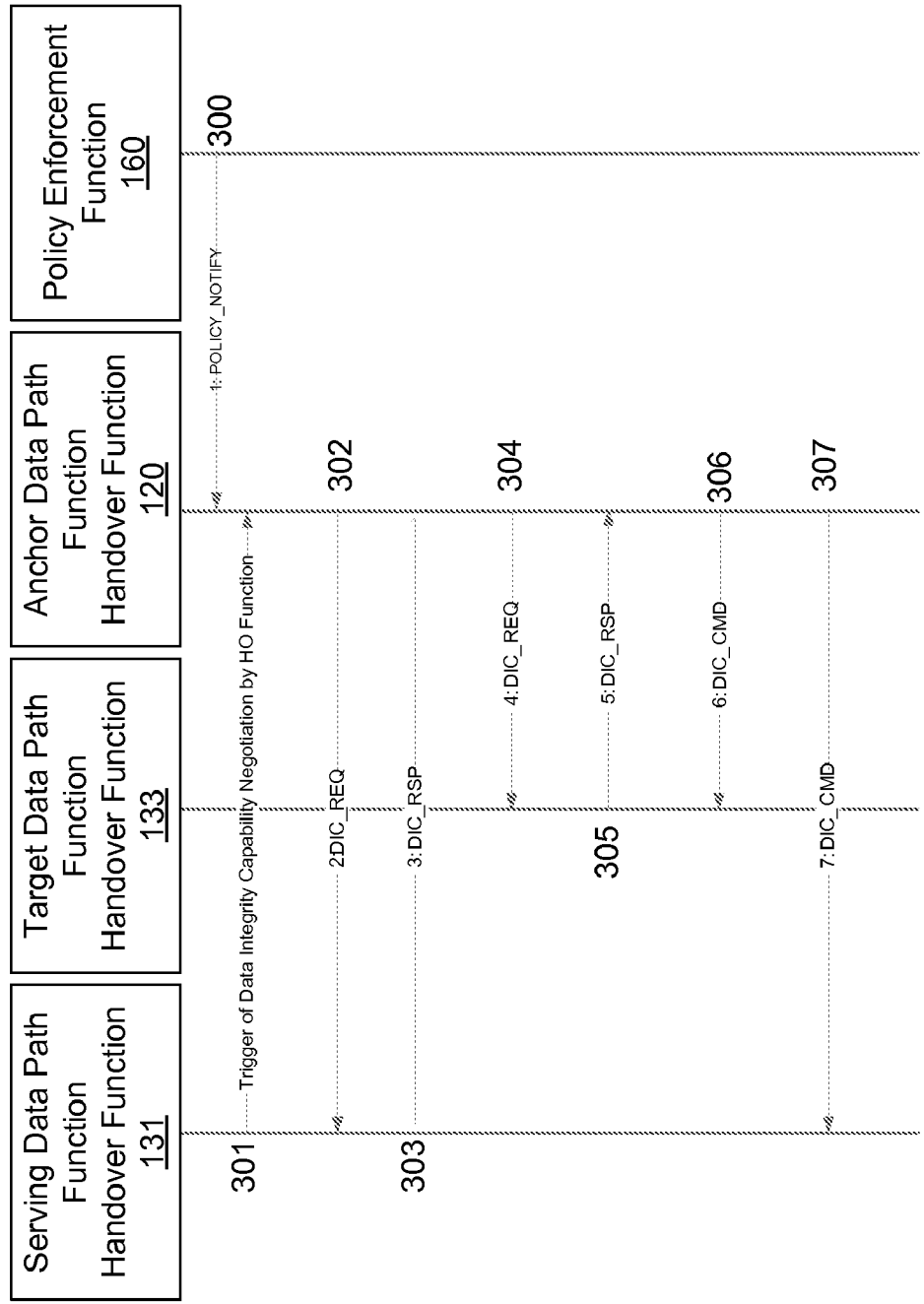
FIG. 3 is a timing diagram of the message exchange within the poll mode data integrity negotiation procedure.

An example of the flow of messages for implementing a data integrity scheme negotiation is shown in FIG. 3. This implementation is based on a polling operation. Upon receiving a handover event 301, the anchor DPF 120 transmits a data integrity capability request (DIC_REQ) message 302 to the serving DPF 131 and a DIC_REQ message 304 to the target DPF 133. The DIC_REQ message is used to gather the data integrity capabilities of the receiver. Both the serving DPF 131 and the target DPF 133 reply with data integrity capability response (DIC_RSP) messages 303 and 305.

Table 2 illustrates the fields of a possible DIC_RSP message in type-length-value (TLV) format, where type refers to the type of the field, length refers to the length of the field, and value refers to the value of the field. The DIC_RSP contains an entity identifier TLV that identifies the relevant data path. The relevant data path is called the DP entity ID. The DIC_RSP contains a data integrity scheme TLV indicating the supported data integrity schemes.

TABLE 3

An example of Data Integrity Scheme TLV

| | |
|---|---|
| Type | Data Integrity Scheme TLV |
| Length in Octets | 1 |
| TLV Values | Bit 0: Multicasting, Bit 1: Buffering, Bit 3:SDU Sequencing, Bit 4-7: TBD.<br>If the bit set to 1, it means the corresponding scheme is on. Otherwise, it's off. |

Table 3 illustrates the data integrity scheme TLV. The DIC_RSP messages are received in the data integrity scheme selection process 200 (alternatively, 200b) by step 203. If process 200 is used, the policy enforcement function (PEF) 160 will forward the policy information (embodied in the policy notification 300) to the anchor DPF 120. Once the process 200 (alternatively, 200b) finishes, the DIC_CMD message 209 is ready to be sent. The anchor DPF 120 sends the DIC_CMD message 306 to the target DPF 133 and a DIC_CMD message 307 to the serving DPF 131.

Figure 4:
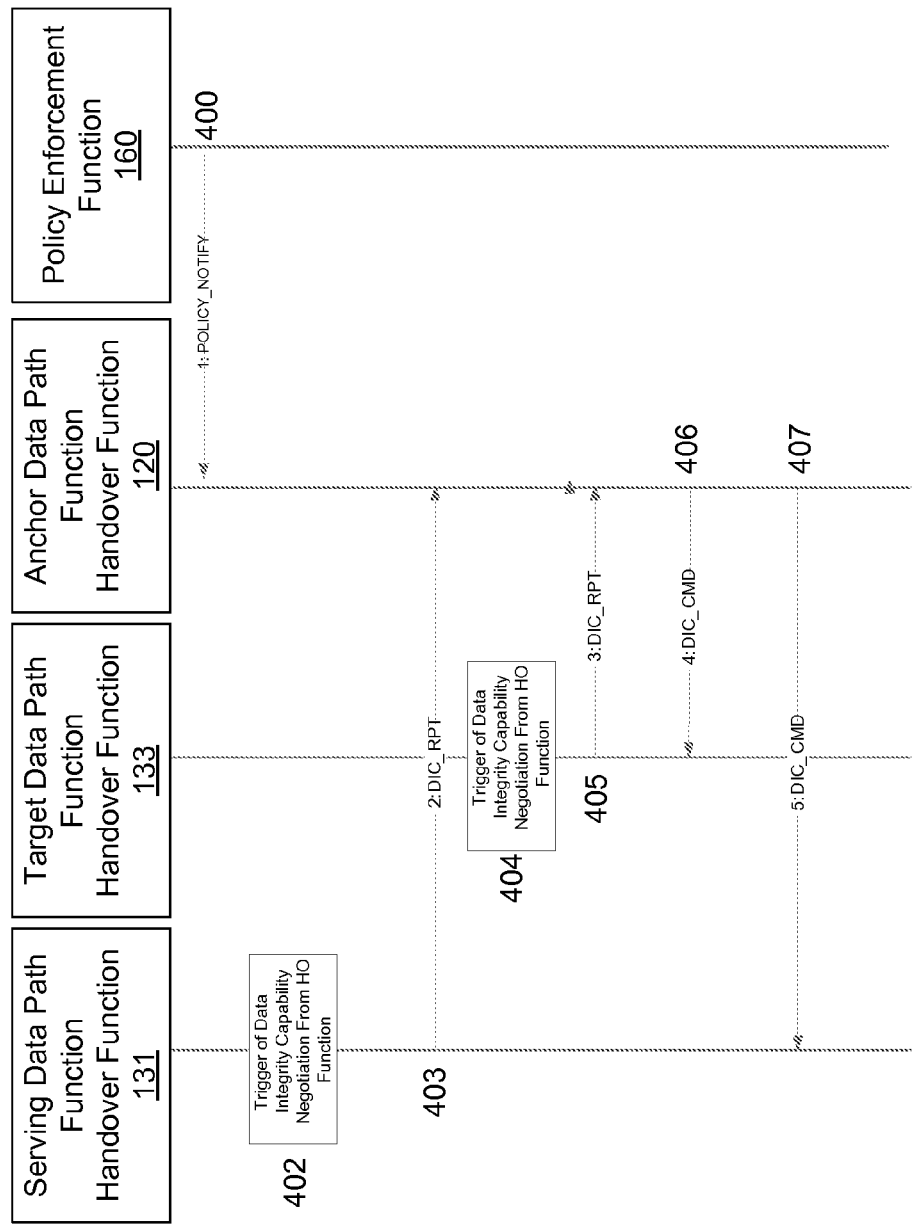
FIG. 4 is a timing diagram of the message exchange within the push mode data integrity negotiation procedure.

FIG. 4 shows an example of the flow of messages for implementing a data integrity scheme negotiation based on a push method. Upon receiving a handover event 402, the serving DPF 131 transmits a data integrity capability report (DIC_RPT) message 403 to the anchor DPF 120. A DIC_RPT messages contains the data integrity schemes supported by the DPF that sends the message. Upon receiving a handover event 404, the target DPF 131 transmits a DIC_RPT message 405 to the anchor DPF 120. The DIC_RPT message format is identical to the DIC_RSP message except that the name of the message differs. The DIC_RPT messages are received in the data integrity scheme selection process 200 (alternatively, 200b) by step 203. If process 200 is used, the policy enforcement function (PEF) 160 will forward the policy information (embodied in the policy notification 400) to the anchor DPF 120. Once the process finishes, the DIC_CMD message 209 is ready to be sent. The anchor DPF 120 sends the DIC_CMD message 406 to the target DPF 133 and a DIC_CMD message 407 to the serving DPF 131.

Figure 5:
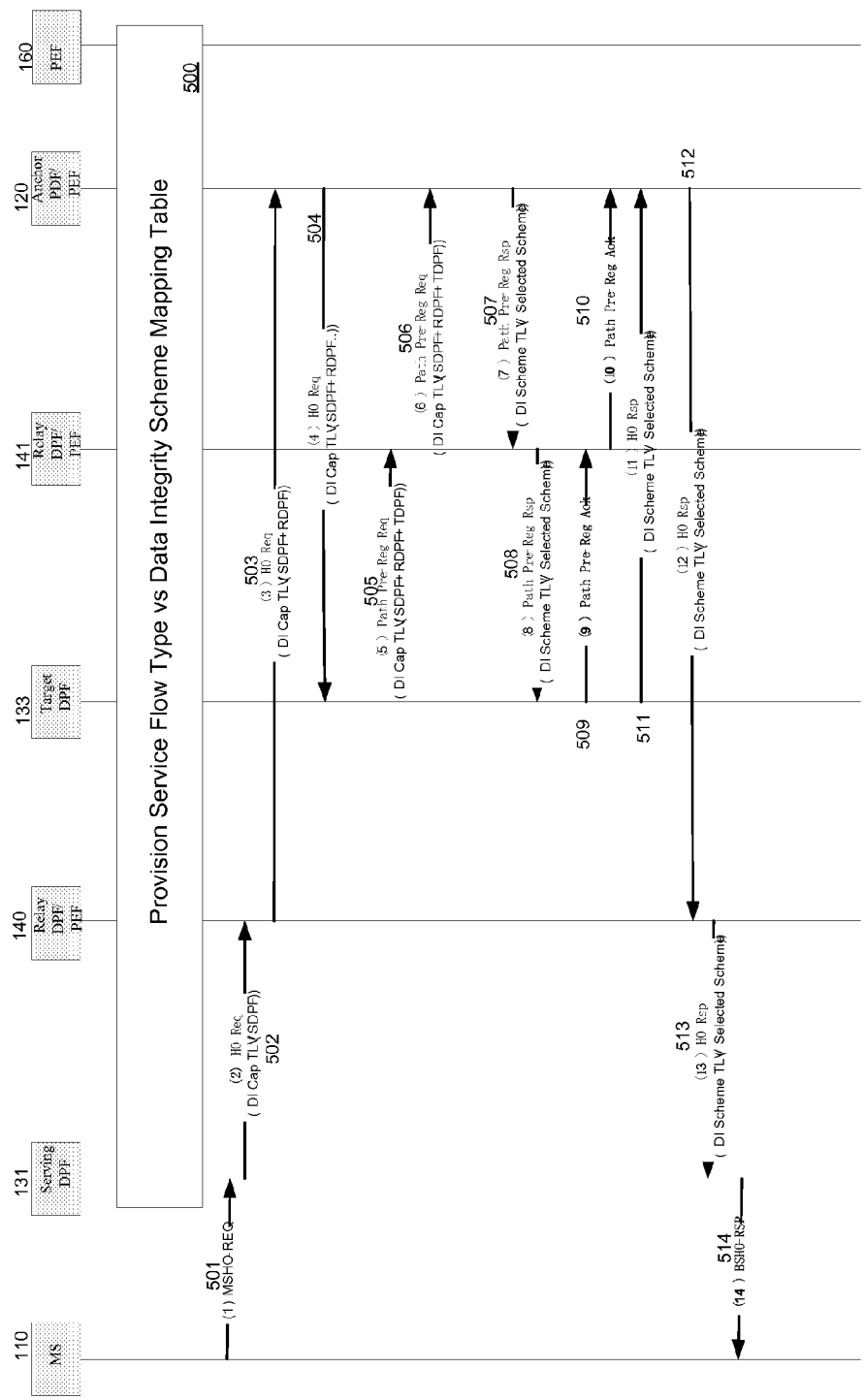
FIG. 5 is a timing diagram of the message exchange within the piggyback mode data integrity negotiation procedure.

FIG. 5 shows an example of the flow of messages for implementing a data integrity scheme negotiation based on a piggyback method. In this method, the mobile station 110 sends a mobile station handover request message 501 to the serving DPF 131. The serving DPF 131 inserts data integrity capability information into the handover request message 502 and sends the request to the relay DPF 140. The relay DPF 140 inserts relay DPF 140 data integrity capability information into the handover request message and forwards the message 503 to the anchor DPF 120. The anchor DPF 120 sends the HO request 504 to the target DPF 133. The target DPF 133 inserts its data capability information into a path pre-registration request message 505 and sends the message to the relay DPF 141. The relay DPF 141 inserts relay DPF 141 data integrity capability information into the path pre-registration request message 506 and sends the request 506 to the anchor PDF 120. The data integrity scheme selection process 200 is used for this implementation. The PEF 160 informs 500 the data path functions 131, 140, 133, 141, 120 of the remote policy information. Step 203 of process 200 acts on the inserted data capability information of messages 504 and 506. Once the process has selected a data integrity scheme 208 and generated a DIC_CMD message 209, the contents of the DIC_CMD message are inserted in the Path Pre-Registration response message 507 and sent to the relay DPF 141. The relay DPF 141 forwards the message 508 to the target DPF 133. The target DPF 133 sends an acknowledge message 509 to the relay DPF 141 which forwards the message 510 to the anchor DPF 120. The target DPF 133 sends a handover response message 511 to the anchor DPF 120. The anchor DPF 120 sends a handover response message 512 with the selected data integrity scheme to relay DPF 140 which forwards the message 513 to the serving DPF 130. The serving DPF 130 sends the base station handover response message 514 to the mobile station 110.

Figure 6:
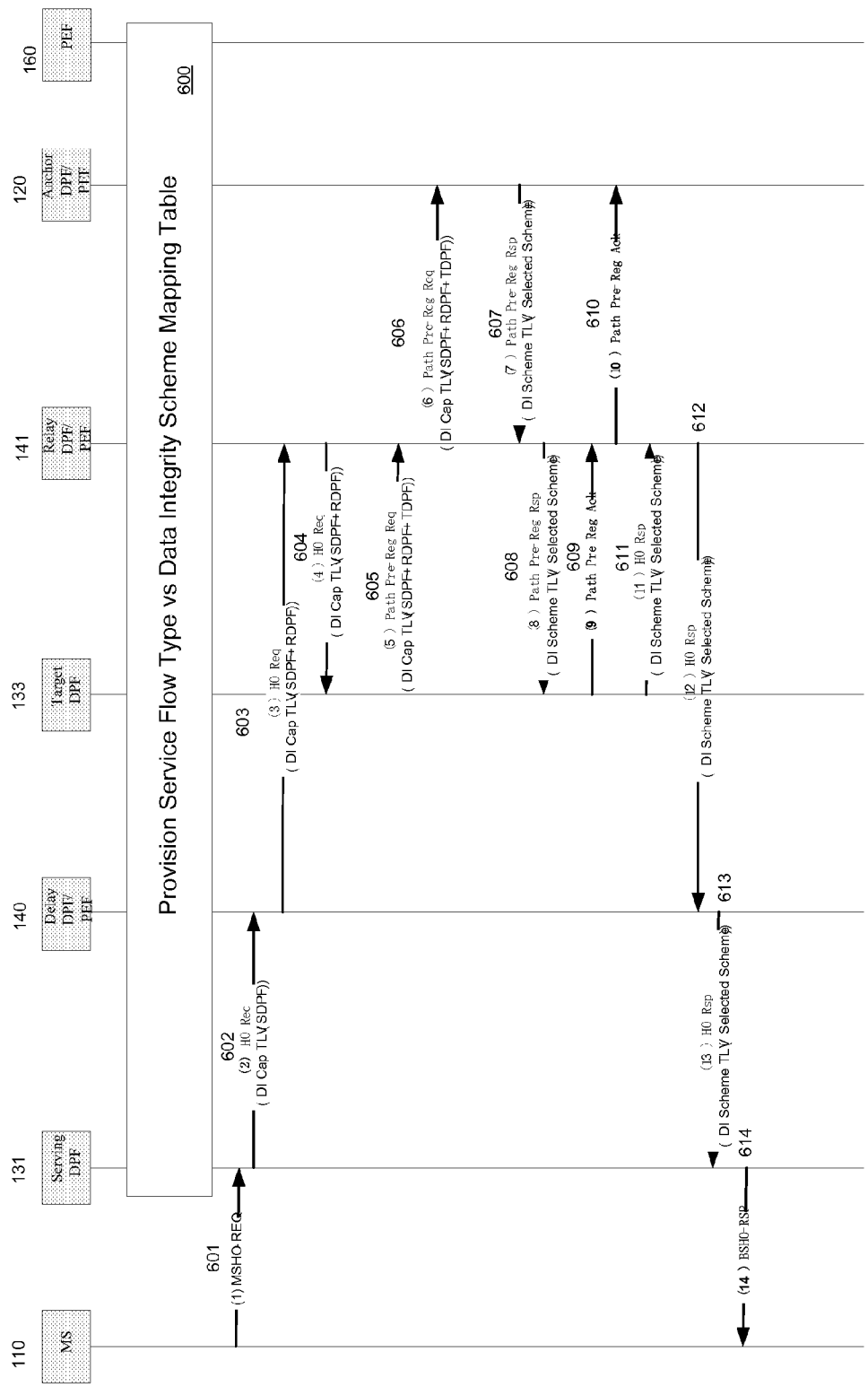
FIG. 6 is a timing diagram of the message exchange within the alternate piggyback mode data integrity negotiation procedure.

FIG. 6 further shows an example of the flow of messages for implementing a data integrity scheme negotiation as an alternate piggyback method. The mobile station 110 sends a mobile station handover request message 601 to the serving DPF 131. The serving DPF 131 inserts data integrity capability information into the handover request message 602 and sends the request to the relay DPF 140. The relay DPF 140 forwards the message 603 to the relay DPF 141. The relay DPF 141 sends the request 504 to the target DPF 133. The target DPF 133 inserts its data capability information along with the received data capability information of message 504 into a path pre-registration request message 605 and sends the request message 605 to the relay DPF 141. The relay DPF 141 sends the request 606 to the anchor PDF 120. The data integrity scheme selection process 200 is used for this implementation. The PEF 160 informs 600 the data path functions 131, 140, 133, 141, 120 of the remote policy information. Step 203 of process 200 acts on the inserted data capability information of messages 606. Once the process has selected a data integrity scheme 208 and generated a DIC_CMD message 209, the contents of the DIC_CMD message are inserted in the Path Pre-Registration response message 607 and sent to the relay DPF 141. The relay DPF 141 forwards the message 508 to the target DPF 133. The target DPF 133 sends an acknowledge message 609 to the relay DPF 133 which forwards the message 610 to the anchor DPF 120. The target DPF 133 sends a handover response message 611 to the relay DPF 141. The relay DPF 141 sends a handover response message 612 with the selected data integrity scheme to relay DPF 140 which forwards the message 613 to the serving DPF 131. The serving DPF 131 sends the base station handover response message 614 to the mobile station 110.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications and enhancements to the described examples and implementations and other implementations may be made based on what is disclosed. Other embodiments are within the scope of the following claims.

What is claimed is:

1. A method for providing data integrity in a wireless communication network, comprising:
   providing a quality of service (QoS) profile for a service flow, the QoS profile including information of one or more QoS requirements of the service flow and a data integrity indicator to indicate information of data integrity for the service flow;
   indicating whether to use a remote data integrity policy or a local data integrity policy;
   negotiating, using the indicated data integrity policy indicator, a data integrity scheme from one or more data integrity schemes available to the service flow during a handover of a mobile station from one base station to another base station;
   operating an anchor data path function for the mobile station in the wireless network to collect data integrity information from data path functions in network entities related to the service flow for the mobile station;
   selecting the data integrity scheme for each network entity that carries the service flow for the mobile station;
   using a message for each of the related network entities to include a data integrity time-length-value field to include the data integrity capability information for each network entity to communicate the data integrity capability information to the anchor data path function for the mobile station; and
   operating the anchor data path function to send a data integrity command message that includes the selected data integrity scheme to each of the related network entities.

2. The method as in claim 1, wherein:
the one or more data integrity schemes include multi-unicasting to a current serving base station and a target base station for the mobile station.

3. The method as in claim 1, wherein:
the one or more data integrity schemes include buffering at an anchor data path function for the service flow and the mobile station and forwarding buffered data to a target base station when the target base station becomes a new serving base station due to the handover.

4. The method as in claim 1, wherein:
the one or more data integrity schemes include an automatic retransmission request (ARQ) scheme.

5. The method as in claim 1, comprising:
providing a mapping between the one or more data integrity schemes and QoS service classes available; and
using the mapping in selecting the data integrity scheme from one or more data integrity schemes available to the service flow during the handover of the mobile station.

6. The method as in claim 5, comprising:
using a remote network entity to provide the mapping.

7. The method as in claim 5, wherein:
the mapping is determined locally.

8. The method as in claim 1, comprising:
using, based on the indication, a data integrity scheme policy local to an access network serving the mobile station.

9. The method as in claim 1, wherein:
the anchor data path function for the mobile station is operated to perform a polling operation which comprises:
upon beginning of the handover, operating the anchor data path function to send a polling message to each of the related network entities to request for a data integrity capability information from each network entity; and
operating the anchor data path function to send a data integrity command message that includes the selected data integrity scheme to each of the related network entities.

10. The method as in claim 1, wherein:
upon beginning of the handover, operating each of the related network entities to report to the anchor data path function the data integrity capability in each network entity; and
operating the anchor data path function to send a data integrity command message that includes the selected data integrity scheme to each of the related network entities.

11. A wireless communication network, comprising:
a plurality of base stations to form a wireless access network to provide wireless radio communications with mobile stations;
a network mechanism to provide (a) a quality of service (QoS) profile for a service flow for a mobile station to include information of one or more QoS requirements of the service flow, (b) indication of whether to use a remote data integrity policy or a local data integrity policy, and (c) a data integrity indicator to indicate information of data integrity for the service flow during a handover of the mobile station from one base station to another base station; and
a plurality of network entities related to the service flow for the mobile station configured to communicate data integrity capability information to an anchor data path function for the mobile station using a message for each of the related network entities to include a data integrity time-length-value field to include the data integrity capability information for each network entity;
a network mechanism to use the data integrity indicator, based on the indicated data integrity policy, to negotiate selection of a data integrity scheme from one or more data integrity schemes available to the service flow during the handover of the mobile station; and
the anchor data path function for the mobile station to collect data integrity information from data path functions in network entities related to the service flow for the mobile station and send a data integrity command message that includes the selected data integrity scheme to each of the related network entities.

12. The network as in claim 11, wherein the network is a 3GPP system.

13. The network as in claim 11, wherein the network is a 3GPP2 system.

14. The network as in claim 11, wherein the network is a WiMAX system.

* * * * *